(12) United States Patent
Cheung (10) Patent No.: US 11,391,297 B2
(45) Date of Patent: Jul. 19, 2022

(54) COMPOSITE FAN CASE WITH NANOPARTICLES

(71) Applicant: PRATT & WHITNEY CANADA CORP., Longueuil (CA)

(72) Inventor: Kin-Leung Cheung, Toronto (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 642 days.

(21) Appl. No.: 15/906,488

(22) Filed: Feb. 27, 2018

(65) Prior Publication Data

US 2019/0136871 A1     May 9, 2019

Related U.S. Application Data

(60) Provisional application No. 62/583,784, filed on Nov. 9, 2017.

(51) Int. Cl.

| | |
|---|---|
| *F04D 29/52* | (2006.01) |
| *B32B 1/02* | (2006.01) |
| *B32B 3/12* | (2006.01) |
| *B32B 27/18* | (2006.01) |
| *F04D 29/02* | (2006.01) |

(52) U.S. Cl.
CPC .............. *F04D 29/526* (2013.01); *B32B 1/02* (2013.01); *B32B 3/12* (2013.01); *B32B 27/18* (2013.01); *F04D 29/023* (2013.01); *B32B 2262/106* (2013.01); *B32B 2305/024* (2013.01); *B32B 2439/00* (2013.01); *B32B 2603/00* (2013.01)

(58) Field of Classification Search
CPC .... F04D 29/526; F04D 29/023; F01D 21/045; B32B 3/12; B32B 27/18; B32B 2603/00; B32B 2439/00; B32B 2305/024; B32B 2262/106; B32B 1/02
See application file for complete search history.

(56) References Cited

U.S. PATENT DOCUMENTS

| | | | |
|---|---|---|---|
| 3,602,602 A * | 8/1971 | Motta | .................... F01D 21/045 |
| | | | 415/197 |
| 4,086,378 A | 4/1978 | Kam et al. | |
| | | (Continued) | |

OTHER PUBLICATIONS

W. Liu, S.V. Hoa, M. Pugh, "Fracture Toughness and Water Uptake of High-Performance Epoxy/Nanoclay Nanocomposites", Composite Science and Technology, pp. 2364-2373, Jun. 2005.

(Continued)

*Primary Examiner* — Kenneth Bomberg
*Assistant Examiner* — Julian B Getachew
(74) *Attorney, Agent, or Firm* — Norton Rose Fulbright Canada LLP (57) ABSTRACT

A composite case for a gas turbine engine includes an inner structure assembly defining an impact containment zone. The inner structure assembly is configured to circumscribe a plurality of rotatable blades of the gas turbine engine and to receive blade fragments in an event of blade failure. The inner structure assembly includes one or more layers containing a resin impregnated therein, and an outer structure assembly surrounding the inner structure assembly and integrally molded thereon. The outer structure assembly includes one or more layers containing a resin impregnated therein. One or more layers of the inner and the outer structure assemblies include resin reinforced by nanoparticles.

17 Claims, 2 Drawing Sheets

(56) References Cited

U.S. PATENT DOCUMENTS

| | | |
|---|---|---|
| 4,438,173 A | 3/1984 | Trost |
| 4,902,201 A | 2/1990 | Neubert |
| 4,961,685 A | 10/1990 | Neubert |
| 5,135,993 A | 8/1992 | Decker et al. |
| 5,437,538 A | 8/1995 | Mitchell |
| 5,447,411 A | 9/1995 | Curley et al. |
| 5,747,560 A | 5/1998 | Christiani et al. |
| 5,883,173 A | 3/1999 | Elspass et al. |
| 6,053,696 A | 4/2000 | Roberts |
| 6,057,035 A | 5/2000 | Singh et al. |
| 6,454,974 B1 | 9/2002 | Wilson |
| 6,558,605 B1 | 5/2003 | Wilson |
| 6,692,064 B1 | 2/2004 | Porter |
| 6,759,463 B2 | 7/2004 | Lorah et al. |
| 6,767,951 B2 | 7/2004 | Nair et al. |
| 6,872,432 B2 | 3/2005 | Wilson |
| 6,977,115 B1 | 12/2005 | Wilson |
| 6,988,305 B1 | 1/2006 | Wilson |
| 7,169,467 B2 | 1/2007 | Wilson |
| 7,244,781 B2 | 7/2007 | Bortnick et al. |
| 7,246,990 B2 | 7/2007 | Xie et al. |
| 7,250,477 B2 | 7/2007 | Guo et al. |
| 7,291,665 B2 | 11/2007 | Lorah |
| 7,294,220 B2* | 11/2007 | Anderson ............... B29C 70/34 |
| | | 156/213 |
| 7,338,250 B2 | 3/2008 | Martindale et al. |
| 7,371,793 B2 | 5/2008 | Gong |
| 7,390,161 B2 | 6/2008 | Xie et al. |
| 7,452,585 B1* | 11/2008 | Wong ..................... C08J 9/00 |
| | | 264/176.1 |
| 7,713,021 B2 | 5/2010 | Finn et al. |
| 7,914,256 B2 | 3/2011 | Xie et al. |
| 8,017,188 B2 | 9/2011 | Xie et al. |
| 8,061,966 B2 | 11/2011 | Xie et al. |
| 8,545,167 B2 | 10/2013 | Cheung |
| 9,248,612 B2 | 2/2016 | Zhu et al. |
| 2004/0041128 A1 | 3/2004 | Carter et al. |
| 2004/0146393 A1 | 7/2004 | Evans et al. |
| 2004/0259996 A1 | 12/2004 | Stoppelmann et al. |
| 2006/0093847 A1* | 5/2006 | Hornick .................... F02K 3/04 |
| | | 428/523 |
| 2006/0134251 A1 | 6/2006 | Blanton et al. |
| 2007/0081887 A1 | 4/2007 | Xie et al. |
| 2007/0128960 A1 | 6/2007 | Ghasemi Nejhad et al. |
| 2007/0142548 A1 | 6/2007 | Nejhad et al. |
| 2007/0265379 A1 | 11/2007 | Chen et al. |
| 2007/0276077 A1 | 11/2007 | Mao et al. |
| 2007/0280817 A1 | 12/2007 | Costa et al. |
| 2008/0086096 A1 | 4/2008 | Voznyakovski et al. |
| 2008/0134939 A1 | 6/2008 | Arpac et al. |
| 2008/0176987 A1 | 7/2008 | Trevet et al. |
| 2008/0200600 A1 | 8/2008 | Schomaker et al. |
| 2008/0305340 A1 | 12/2008 | Fang et al. |
| 2009/0226310 A1 | 9/2009 | Finn et al. |
| 2010/0148396 A1 | 6/2010 | Xie et al. |
| 2010/0150706 A1 | 6/2010 | Xie et al. |
| 2015/0240658 A1 | 8/2015 | Voleti |
| 2015/0308290 A1 | 10/2015 | Kappes |
| 2017/0234160 A1 | 8/2017 | Gemeinhardt et al. |

OTHER PUBLICATIONS

Y. Xu, S.V. Hoa, "Properties Enhancement of Carbon-Fiber-Reinforced Epoxy/Clay Nanocomposites", Cancom 2007, NM-5.

D. Ratna, N.R. Manoj, R. Varley, R.K. Singh Raman, G.P. Simon, "Clay-Reinforced Epoxy Nanocomposites", Polymer International, pp. 1403-1407, 2003.

G. Zhou, L.J. Lee, "Nano-Clay and Long Fiber Reinforced Composites Based on Epoxy and Phenolic Resins", ANTEC 2003, pp. 2094-2098, 2003.

Ming Xie, Intelligent Engine Systems: Smart Case System, NASA/CR-2008-215233, May 2008.

Roger L. Ellis, "Ballistic impact resistance of graphite epoxy composites with shape memory alloy and extended chain polyethylene spectra™ hybrid components", Dec. 1996, Blacksburg, Virginia.

International Search Report, PCT/US2008/055645, dated Jul. 23, 2008.

* cited by examiner

COMPOSITE FAN CASE WITH NANOPARTICLES

CROSS-REFERENCE TO RELATED APPLICATIONS

This application claims priority of U.S. Patent Application No. 62/583,784 filed Nov. 9, 2017, the entire contents of which are incorporated herein by reference.

TECHNICAL FIELD

The application relates generally to casings for rotating blades and, more particularly, to such a composite fan case for a gas turbine engine.

BACKGROUND

The fan casing of an aircraft gas turbine engine is required to contain released fan blades in the event of blade failure. Fiber reinforced polymer composite materials have been used in fan casings because of their high strength to density ratio when compared to metal alloys.

When fiber reinforced polymer composite material is subjected to a high energy impact, such as in a fan casing during blade release, the impact energy is generally absorbed by fiber breaking, fiber pull out, resin cracks, and ply delamination. A fan casing usually has to be able to absorb impact energy, resist puncture, and maintain structural integrity for safe engine shutdown.

Fiber fracture and fiber pull out from resin generally act to absorb energy via the creation of new surfaces between the fibers and the resin due to the mechanical force that breaks the fibers and the frictional force that pulls and separates the fibers from the resin. However, fiber break and fiber pull out may reduce the load carrying capability and structural integrity of the composite material, post impact, as broken and pulled out fibers can no longer effective transfer loads to other fibers through the resin.

SUMMARY

Structures and methods that can reduce the amount of fiber break and the amount of fiber pull out damage from failed blade impact in the fan case containment area are provided, which can make a fan case structure lighter and yet have better retained structural strength and stiffness in the fan case for safe engine shut down and fly to land after blade impact damage.

In one aspect, there is provided a composite case for a gas turbine engine, the composite case comprising: an inner structure assembly defining an impact containment zone, the inner structure assembly configured to circumscribe a plurality of rotatable blades of the gas turbine engine and to receive blade fragments in an event of blade failure, the inner structure assembly including one or more layers containing a resin impregnated therein; an outer structure assembly surrounding the inner structure assembly, the outer structure assembly including one or more layers containing a resin impregnated therein; and the resin impregnating the one or more layers of the inner and outer structure assemblies comprises nanoparticles therein.

In another aspect, there is provided a composite fan case of a gas turbine engine, the composite fan case comprising: an inner honeycomb structure configured to circumscribe a plurality of fan blades of the gas turbine engine; and at least one outer structure assembly surrounding the innermost honeycomb structure, the at least one outer structure assembly including a layer containing a fiber resin impregnated therein, the resin reinforced by a plurality of nanoparticles within the resin.

In a further aspect, there is provided a method of containing blade fragments within a fan case of a gas turbine engine in an event of blade failure, the method comprising: allowing the blade fragments to puncture an inner structure assembly of the fan case in the event of the blade failure while minimizing delamination of the inner structure assembly; allowing the blade fragments to impact an outer structure assembly of the fan case, the outer structure assembly surrounding the inner structural layer; and absorbing energy released from the impact between the outer structure assembly and the blade fragments using a polymer resin impregnated within the outer structure assembly, the polymer resin reinforced by nanoparticles.

BRIEF DESCRIPTION OF THE DRAWINGS

Reference is now made to the accompanying figures in which.

DETAILED DESCRIPTION

Figure 1:
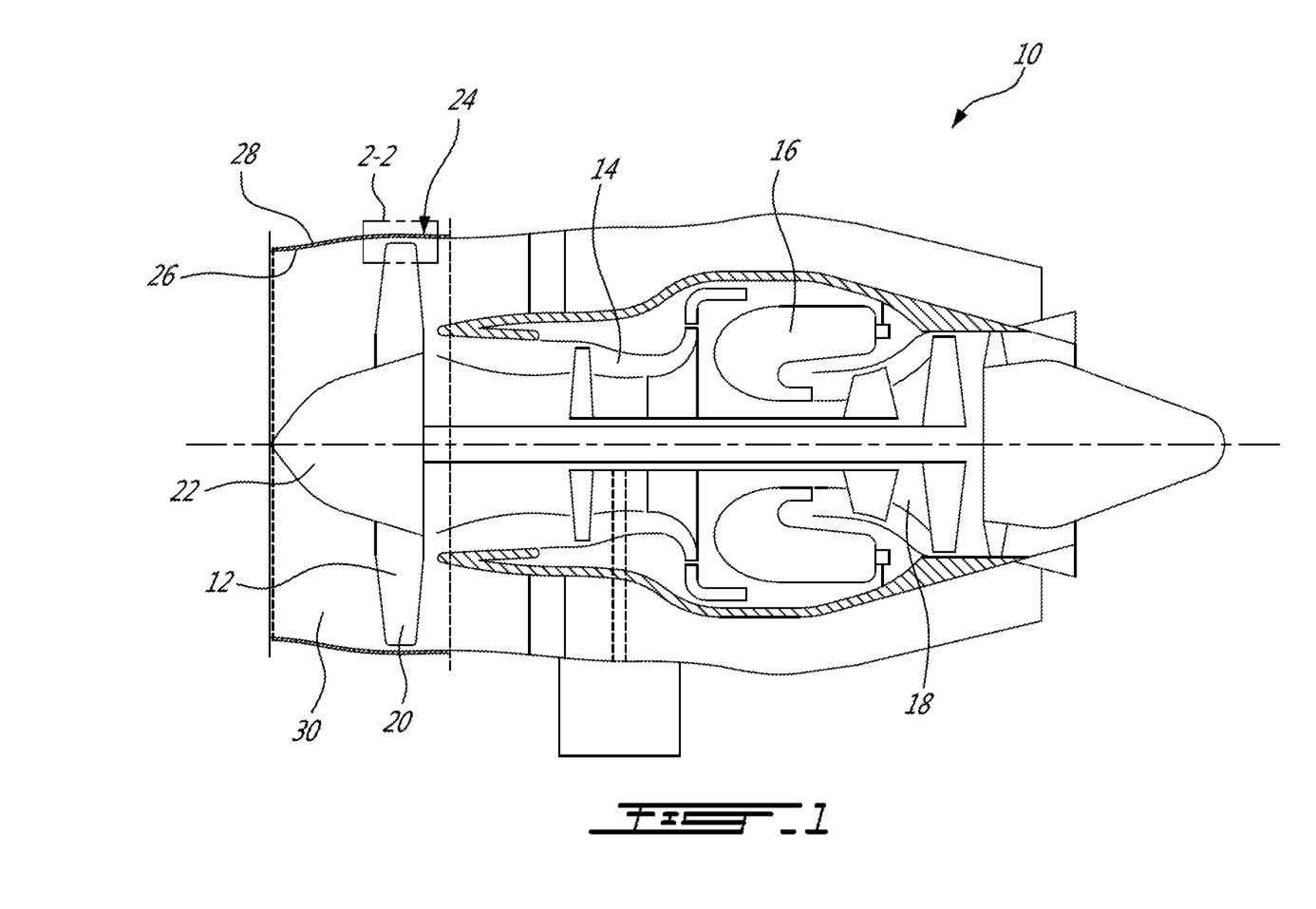
FIG. 1 is a schematic cross-sectional view of a gas turbine engine, including a fan case according to a particular embodiment.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases.

Figure 2:
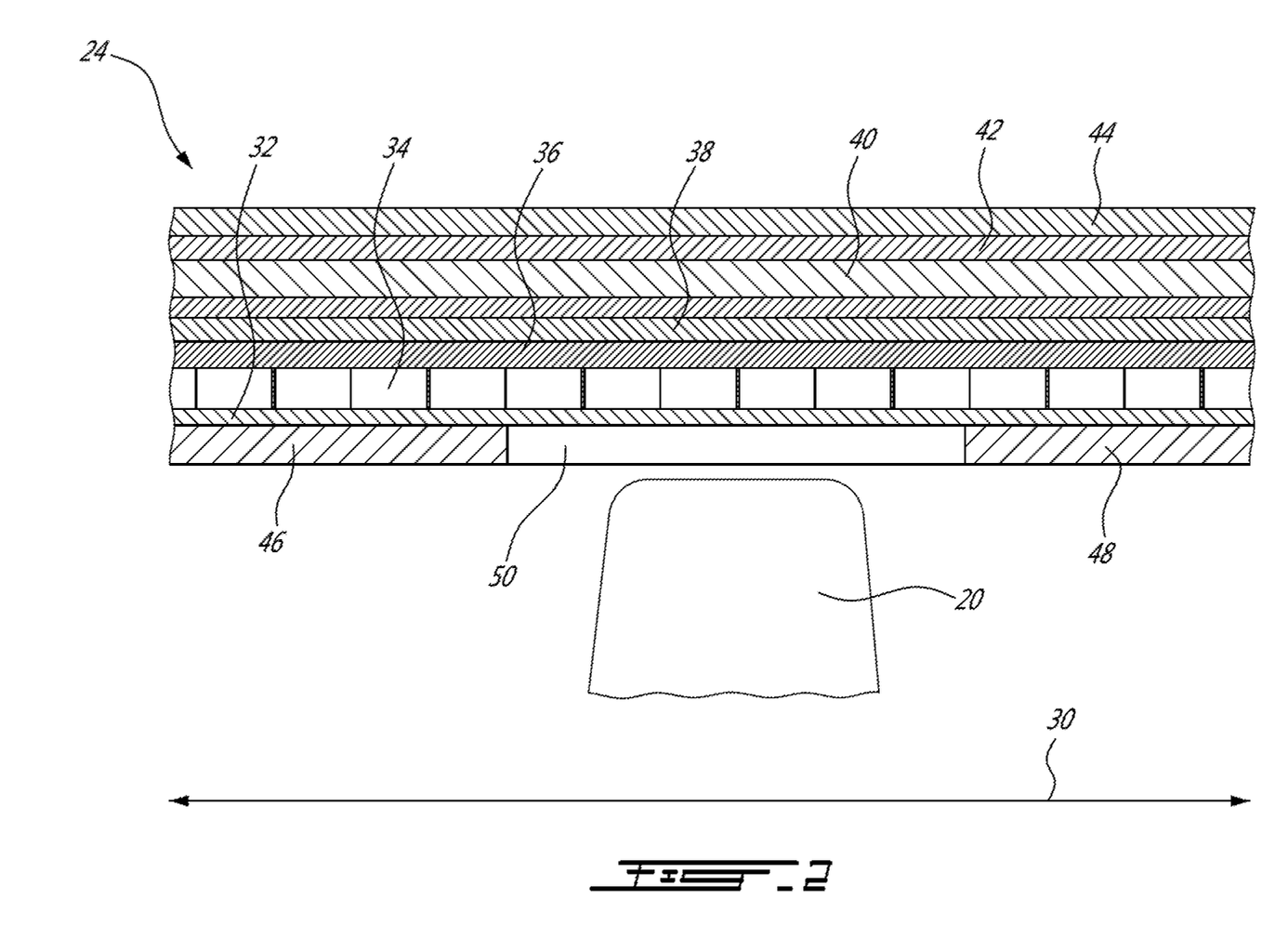
FIG. 2 is a schematic cross-sectional view of a blade containment area of the fan case shown in FIG. 1.

Referring to FIGS. 1-2, the fan assembly 12 includes an array of fan blades 20 extending radially outward from a rotor disc 22. A fan case 24 surrounds the fan assembly 12. The fan case 24 provides an impact containment area or zone 30 (FIG. 2) for the fan blades 20 in an event of blade failure. The containment area 30 of the fan case 24 can extends axially and radially relative to the fan case 24. In the event of the blade failure, the fan blades 20 and/or blade fragments or broken blades of the fan blades 20 are released and projected toward the fan case 24. The released fan blades 20 impact the containment area 30 of the fan case 24 and can be consequently captured by the fan case 24. The containment area 30 is designed to be more robust than areas of the fan case 24 outside of the containment area 30. The design of the containment area 30 is designed for blade impact and containment as well as to maintain post blade impact structural integrity of the fan case 24 to allow the aircraft to land safely. The areas outside of the containment area 30 can be designed to be less robust than the containment area 30 to lower the cost and/or weight of the fan case 24 while at least maintain a sufficient structural integrity of the fan case 24 for a safe engine shut down and to allow the aircraft to land after a blade impact.

The containment area 30 can extend from a predetermined length forward of a leading edge of the fan blade 20 to a predetermined length aft a trailing edge of the fan blade 20. The predetermined lengths may be selected depending on engine designs and is typically determined by analysis using proprietary analytical tools. Factors that can affect the forward and aft predetermined lengths can include, but are not limited to, inclined fixing angle of a blade root with respect to a fan hub, diameter of a fan hub where the blade root fixing is located, airfoil length and shape of a blade, airfoil center of mass of a blade, spacing between blades, blade tip clearance, fan rotor speed, fan blade material and its mechanical property, materials of the fan case 24 and its mechanical property, and the like. The containment area 30 can extend over an entire axial length of the fan case 24 or a portion of the axial length of the fan case 24. In a particular embodiment, the containment area 30 extends over the entire axial length of the fan case 24 between a front attachment flange and a rear attachment flange of the fan case 24.

In the particular embodiment shown in FIG. 1, the fan case 24 includes an inner structure assembly 26 surrounded by an outer structure assembly 28. The combination of the two structure assemblies 26 and 28 can form the fan case 24 with a structural strength and containment capabilities to contain the released fan blades 20 within the fan case 24 in the event of a blade failure. The inner structure assembly 26 is configured to primarily maintain the structural strength and stiffness of the fan case 24 and the outer structure assembly 28 is configured to primarily contain and absorb energy released during an impact between the released fan blade 20 and the outer structure assembly 28. While the inner structure assembly 26 may provide a majority of the structural strength and/or stiffness to the fan case 24 and the outer structure assembly 28 may provide a majority of the energy absorption capability of the fan case 24, it is however to be understood that each of these structure assemblies can provide some of structural integrity and energy absorption requirements of the fan case 24.

The inner structure assembly 26 and the outer structure assembly 28 can be assembled together as a single integral unit. For example, the inner and outer structure assemblies 26, 28 may be integrally molded into a single unit or piece without using fasteners that can pierce through the inner and outer structure assemblies 26, 28, such as bolts or the like. In the embodiment shown in FIG. 2, the inner structure assembly 26 and the outer structure assembly 28 are attached without using mechanical fasteners or other removable fastening means.

For example, a glass ply face sheets in the honeycomb sandwich structure may be pre-formed in two half segments (e.g. each segment being semi-circular and extending circumferentially 180 degrees, such that when placed together they form a complete annular structure). Edges of the cells of the honeycomb at the ends of the segments may be sealed by closed cell foam adhesive or by paste adhesive. The segments may lay inside a mold cavity sequentially with the fiber fabric/weaves, and then are cured with resin in the mold to form the fan case.

In a particular embodiment, the inner structure assembly 26 circumscribes, at least, the containment area 30. The inner structure assembly 26 can be formed such as to have a structural stiffness and/or strength to allow the released fan blades 20 to puncture and pass through the inner structure assembly 26 while maintaining an adequate post impact structural strength and stiffness to maintain the integrity or a sufficient integrity of the fan case 24. The inner structure assembly 26 can have a first stiffness configured to confine crack propagation to a first region of the impact containment area 30 due to a passage of a blade fragment corresponding to one of the released fan blades 20. The inner structure assembly 26 can include a number of layers, as described further below.

The outer structure assembly 28 circumscribes the inner structure assembly 26 to form the fan case 24. The outer structure assembly 28 is formed such as to spread an impact deformation of the outer structure assembly 28 over a large region of the outer structure assembly 28 caused by the impact between the released fan blades 20 or blade fragments and the outer structure assembly 28. Spreading the impact deformation can spread the energy caused by the impact and thus reduce a peak impact load. That is, spreading the impact deformation over a larger area allows more material to deform and absorb more impact energy, and thus may reduce the peak blade impact load to the fan case and reduce the peak load in the fan case connecting structures. The outer structure assembly 28 can have a second stiffness configured to deform a second region of the outer structure assembly 28, for example due to an impact between the corresponding blade fragment and the outer structure assembly 28. In some embodiments, the second region is greater than the first region. The outer structure assembly 28 can include a number of layers as described below.

FIG. 2 illustrates a cross-sectional view of the fan case 24 in accordance with a particular embodiment of the present disclosure. An innermost layer of the inner structure assembly 26 of the fan case 24 is shown at 32. The term "layer" is intended to include a layer with one ply or any suitable number of "plies" or "ply layers", or any suitable fiber weave fabric or fiber weave fabric layers. The layer 32 can be axially continuous between, and connected to, the front attachment flange and the rear attachment flange (not shown) of the fan case 24. In a particular embodiment, the layer 32 consists of at least three plies of carbon fiber. One or two plies or ply layers may also be used. Each ply may consist of 3K tow (i.e. 3000 filaments per fiber) carbon fiber with a tensile strength of 650 to 800 ksi. Alternately, 1000 ksi nominal tensile strength carbon fiber may be used in any or all of the plies. In another particular embodiment, the ply of the layer 32 consists of a carbon fabric weave equivalent to at least 3 or more plies of 3K tow carbon fiber with a tensile strength carbon fiber of 650 to 1000 ksi. The layer 32 forms a structural part of the fan case 24 for safe engine shut down and to allow the aircraft to land after a blade impact.

A subsequent radially outer layer relative to the layer 32 is shown at 34. The layer 34 includes a honeycomb sandwich and spans at least the full length of the containment area 30 of the fan case 24. In a particular embodiment, the honeycomb sandwich is formed from aluminum honeycomb to avoid moisture absorption and strength degradation from moisture absorption. In the embodiment shown in FIG. 2, the layer 34 includes one ply S-glass face sheet bonded to an inner diameter of the honeycomb sandwich and one ply S-glass face sheet bonded to an outer diameter of the honeycomb sandwich. Specific strength of the S-glass fiber is higher than E-glass fiber and thus S-glass may be used for better blade impact energy absorption, better blade containment and better weight efficiency relative to E-glass fibers. The S-glass face sheets can be bonded using epoxy film adhesive. The S-glass face sheet galvanically separates the aluminum honeycomb of layer 34 from the carbon fiber in layer 32 thereby reducing and/or preventing galvanic corrosion between the aluminum honeycomb and the carbon fiber plies. Alternately, a face sheet made of E glass and/or polymer such as, but not limited, to aramid, may be used in lieu of the S glass face sheet. Honeycomb sandwich can provides stiffening with an efficient weight since structural stiffness is proportional to thickness to the power of three. Therefore, the use of the honeycomb sandwich can allow the fan case 24 to be constructed with less carbon fiber plies while providing stiffness equivalent to a fan case with more carbon fiber plies. The reduction in carbon fiber plies provides a lower weight of the fan case 24 for improved weight reduction. The honeycomb sandwich structure provides structural strength and stiffness to the fan case 24.

A subsequent radially outer layer relative to the layer 34 is shown at 36. The layer 36 is made of high strength carbon fiber and spans at least the full length of the containment area 30 of the fan case 24. High strength material absorbs more energy relative to lower strength material at initial blade impact as the released fan blade 20 may shear through the material with little to no deformation of the material. In use, the speed of the released fan blade 20 at impact contact with layer 36 is generally high enough to shear through the layer 36 with little to no time for material deformation. Thus high fiber strength material can be more beneficial for use in layers 32 and 36 relative to more ductile and less strength materials. The layer 36 can more quickly decelerate the released fan blade 20. In a particular embodiment, the layer 36 includes 1000 ksi nominal tensile strength carbon fiber. The layer 36 can include at least five or more plies of 1000 ksi nominal tensile strength carbon fiber. Alternately, the layer 36 may include a carbon fabric weave equivalent to at least five or more plies of 3M tow 1000 ksi carbon fiber plies. Higher tensile strength carbon fiber can be used in layer 36 to reduce the weight of the fan case 24 relative to more plies of a weaker tensile strength carbon fiber. For example, five plies of a 1000 ksi tensile strength carbon fiber can be equivalent to eight plies of a 650 ksi carbon fiber or to six plies of an 800 ksi carbon fiber. Therefore, the use of five plies of 1000 ksi carbon fiber in layer 36 can reduce the equivalence of three plies of 650 ksi carbon fiber or one ply of 800 ksi carbon fiber for weight reduction if weaker carbon fibers are used.

A subsequent radially outer layer relative to the layer 36 is shown at 38. In a particular embodiment, the layer 38 is made of carbon fiber of 650 to 800 ksi nominal tensile strength carbon fiber and can thus optimize weight for lower cost. Some of the plies of the layer 38 spans or extends at least the full length of the containment area 30 of the fan case 24 while other plies of the layer 38 spans the full length of the axial length of the fan case 24 between the front and rear attachment flanges. In a particular embodiment, some of the plies of the layer 38 spans the front and rear attachment flanges. The layer 38 can include any suitable number of plies.

In a particular embodiment, the inner structure assembly 26 of the fan case 24 includes the combined layers 32, 34, 36, 38 and has sufficient structural strength and stiffness after blade impact and penetration damage to provide safe engine shut down and to allow the aircraft to land after the blade impact. The combination of the layers 32, 34, 36, 38 allows the released fan blade 20 to puncture the inner structure assembly 26 and to pass therethrough. The puncture of the inner structure assembly 26 can reduce delamination of the layers 32, 36, and 38. In the embodiment shown in FIG. 2, the combined layers 32, 34, 36, 38 are integrally molded together. The inner structure assembly 26 may include additional layers. Alternately, the inner structure assembly 26 is comprised of any one or more of the layers 32, 34, 36, 38.

A subsequent radially outer layer relative to the layer 38 is shown at 40. In a particular embodiment, the layer 40 can be made of open-cell metal foam filled with closed-cell polymer foam (e.g. cells of the metal foam filled with polymer foam). Alternately, the layer 40 can be made of honeycomb filled with closed-cell polymer foam (e.g. cells of the honeycomb filled with polymer foam).

Option 1: open-cell metal foam filled with closed-cell polymer foam

In the particular embodiment where layer 40 is made of closed-cell metal foam and/or polymer foam filled metal foam, generally every arm of the metal foam is fully supported in space by the closed-cell polymer foam. Consequently, buckling resistance of the metal arms can be enhanced since higher energy level can be needed to buckle and deform the supported metal arms. Space filled metal foam or pores filled metal foam can be more crush resistant and absorb more energy per unit weight relative to equivalent unit weight of metal foam and equivalent unit weight of polymer foam applied in separate layers.

In a particular embodiment, the metal foam has an average crystalline grain size of less than 100 nanometers. In an alternate embodiment, the average crystalline grain size is less than 50 nanometers. In an alternate embodiment, the average crystalline grain size is less than 20 nanometers. A smaller grain size may provide higher yield strength because of the Hall-Petch effect that yield strength is inversely proportional to the square root of the average grain diameter. Therefore metal foam in nanometer crystal grain size can be stronger, absorb more energy and has higher specific energy absorption than conventional metal foam of the same foam density, for example with an average crystalline grain size four orders of magnitude higher.

In use, the metal foam is an open-cell foam. The open-cell(s) can be filled by using heat expandable epoxy syntactic film such as but not limited to SynSpan® syntactic film. The metal foam of nanometer crystalline grain size can be made from, but not limited to, nickel, nickel alloy, or nickel cobalt alloy. In a particular embodiment, the open-cell metal foam is preformed into halves of 180 degrees segments and filled by closed-cell foam by heat expansion and cure of the SynSpan® syntactic film.

Option 2: closed-cell polymer foam filled aluminum honeycomb

In the particular embodiment where layer 40 is made of closed-cell polymer foam filled honeycomb, the blade impact energy absorption characteristics are similar to those described for closed-cell polymer foam filled open-cell metal foam, in that the buckling resistance of the honeycomb cell walls that are fully supported in space by the closed-cell polymer foam can be enhanced since higher energy level can be needed to buckle and deform the supported cell walls. Thus some of the effects for the containment area of the fan case 24 are similar to what is described for option 1 above.

A foam layer disposed in the containment area of the fan case 24 may provide low threshold energy absorption of the impact energy and may spread the impact energy over larger areas of deformation. For example, when the released fan blade penetrates the fiber plies in layers 36 and 38, the low strength and low stiffness foam will deform and thus spread the impact energy over a larger area relative to high strength and high stiff materials. That is, the impact damage area at the backside is larger than at the front side as a result of ply delamination, and the low strength and low stiffness foam deforms in conformity with the increased backside damage. Spreading the deformation over a larger area can reduce peak stress level in subsequent high strain fiber plies when the subsequent layer is stretched by the released fan blade. Spreading the deformation can increase ply deformation areas and thus increase the amount of material available for energy absorption via ply stretch deformation and hence reduce the average stress in the plies. Reducing the average stress in plies reduces the number of plies that would get penetrated by the released fan blade 20 and thus reduces the number of plies needed to contain the released fan blade. The foam can also deform at a lower energy threshold level relative to continuous fiber stretch, fiber break, fiber pull out from resin, and ply delamination of a composite material. The term "lower energy level" is intended to indicate that a material will deform and/or break prior to another stronger material. For example, when the foam is being crushed and compacted by a released blade, the foam can continue to deform and to compress at a low energy level and the average stress level increase is small in the progression of the foam crushing and foam compaction process. This effect can continue until the released blade penetrates the foam and stretch a subsequent high strain fiber layer or layers. When the subsequent high strain fiber layer is stretched by the released fan blade, a high elongation and/or stretching of the high strain fiber layer by the released blade would in turn crush and compact or compress the foam layer at the sides (e.g. two) orthogonal to the blade impact side, and continues all the way to the opposite side of the blade impact side according to Poisson's effect, when the high strain fiber layers are stretched by the released fan blade. A portion of the foam in the foam layer can thereby absorb a portion of the blade impact energy at a low energy level. Energy absorbed at low energy level reduces the peak energy of the blade impact by an amount equal to the energy absorbed at the low energy level. This can reduce the peak blade impact load on the fan case 24 as well as reduce the amount of energy that needs to be absorbed at high energy level from the breaking of the continuous fibers, from fiber pull out, and from ply delamination. The term "high energy level" is intended to indicate the energy required to break the continuous fibers, pull out fibers from the resin and/or delaminate the ply or plies. The term high energy level is used relative to the term low energy level. In addition, a reduction in peak blade impact energy/load on the fan case 24 has an additional effect to reduce the weight of connecting structures of the fan case 24, i.e. the engine air inlet case and structure connected to the fan case front flange, the engine intermediate case structure connected to the fan case rear flange, and the aircraft to engine mount structure connected to the engine. The foam, or the honeycomb that may be provided in layer 40 that is not crushed by the released blade and not crushed/compacted by the stretching of the high strain fiber layers 42 can continue to serve as a stiffener of the fan case 24 for safe engine shut down and to allow the aircraft to land after a blade impact and can also contribute to reduce the number of plies required for post blade impact case stiffening.

The close-cell polymer foam, the honeycomb, and the open-cell metal foam can be weight efficient and effective vibration damping materials. While these materials can also have good energy absorption efficiency, fan case vibration damping might take preference in choosing the most suitable material performance characteristics for the polymer foam, honeycomb, and metal foam. This is because the fan case 24 should not operate in any unacceptable vibration modes at all engine operating conditions. Whereas blade containment is a one-time failure event. Fan case vibration damping can be tuned and adjusted by polymer foam density, honeycomb density, honeycomb cell height, metal foam density, metal foam thickness (height) and/or combinations of any of the above.

A subsequent radially outer layer relative to the layer 40 is shown at 42. In a particular embodiment, the layer 42 is made from high strain (i.e. high elongation) fiber ply or plies or fiber weaves. In a particular embodiment, the high strain fiber plies are interlaid with a thin polymer film is perforated. The thin polymer film may have a nominal thickness of 0.0001 inch thick. The perforated polymer film has a plurality of perforations or holes defined therein, which intermittently weaken the bonding between each of the high strain fiber layers. The high strain fiber ply layers can be well bonded through the holes, but are weakly bonded to the polymer film between the fiber layers. Thus, the breaking of bonds between the polymer film and the high strain fiber plies is promoted, when the high strain fiber plies in the layer 42 are stretched and deformed by a released fan blade 20. Breaking the bonds between the polymer film and the high strain fiber layer propagates resin cracks between the plies, which can thus increase the areas of deformation and the amount of fibers in the ply layer that can stretch and deform to spread the blade impact energy. This permits more impact energy to be absorbed by each ply of the layer 42, and thereby increase the amount of energy absorbed and increase the energy absorption efficiency in each ply. Increased area of ply deformation also lowers the average stress in the ply and reduce the number of plies that can be penetrated by the released fan blade or blade fragments as more blade impact energy is absorbed, hence reducing the number of ply layers needed for blade containment and that reduce the fan case weight.

In an alternate embodiment, carbon nanotube film of tensile strength and ductility that is superior to para-aramid or ultrahigh molecular weight polyethylene is place in between each ply of the high strain fiber plies in addition to providing the perforated polymer film with the holes. Carbon nanotube film of superior energy absorption efficiency relative to the high strain fibers can further reduce the number of plies needed for blade containment, thus lowering the weight of the fan case 24. The polymer film with the perforated holes can be, but not limited to, polyethylene and polyester. In a particular embodiment, the layer 42 consists of at least three or more high strain fiber plies.

The high strain fiber can include for example be, but not limited to, ultrahigh molecular weight polyethylene such as Spectra® or Dyneema®, para-aramid such as Kevlar® or Twaron®, continuous carbon nanotube, polymer doped continuous carbon nanotube, and/or continuous carbon nanotube film. The high strain fiber plies may be a hybrid fiber fabric of two or more of the aforementioned high strain fibers, which may lower cost. In a particular embodiment, the average fracture strain of the high strain fibers is at least 3.5%, and for continuous carbon nanotube film is at least 5%. For a comparison example, the average fracture strain of carbon fiber is less than 2%.

Although most often fan case vibration damping can be effectively designed and tuned by using the material variables mentioned in layer 40. The holes pattern for the thin polymer film perforate holes, holes size, percent open hole area, and holes spacing can be changed or varied when necessary for fan case vibration damping. The pattern of the holes, size of the holes, percent open hole area, and holes spacing can be made different at the different high strain fiber layers in layer 42 where necessary for fan case vibration damping.

A subsequent radially outer layer relative to the layer 42 is shown at 44. In the embodiment shown, the layer 44 is the outermost layer of the fan case 24. In a particular embodiment, the layer 44 includes carbon fiber composite material. The layer 44 can be formed from one ply of 650 to 1000 ksi tensile strength carbon fiber. In an alternate embodiment, the layer 44 can be formed from more than one carbon fiber plies. The layer 44 can protect the fiber plies of the layer 42 from property degradation that may be caused from environmental exposure.

In a particular embodiment, the outer structure assembly 28 of the fan case 24 includes the combined layers 40, 42, 44 and has sufficient energy absorption to contain the released fan blade within the fan case 24. In the embodiment shown in FIG. 2, the combined layers 40, 42, 44 are integrally molded together. The outer structure assembly 28 may include additional layers. Alternately, the outer structure assembly 28 is comprised of any one or more of the layers 40, 42, 44.

The fan case 24 can also include a layer 46 of acoustic treatment upstream of the fan blades 20 and a layer 48 of acoustic treatment downstream of the fan blades 20 relative to a flow through the fan 12. The fan case 24 can also include an abradable layer 50 for blade clearance control.

In a particular embodiment, any one or more of the layers 32, 36, 38, 42 and 44 can include a polymer resin that is reinforced with nanoparticles. Layers 34 and 40 are free from such resin that is reinforced with nanoparticles.

The nanoparticles within the resin break, fracture and/or separate from the resin at low energy level. Accordingly, the threshold forces available to cause the fiber fracture and fiber pull out are reduced at the impact area when the nanoparticles break and separate from the resin. Therefore, the addition of nanoparticles within the resin that impregnates one or more of the layers of the fan case 24, especially in the blade containment area, can reduce the size and the amount of the impact damage to the continuous reinforcement fibers in the blade containment area and thus improve the retained structural strength and stiffness of the fan case 24 after the containment area is damaged by an impact from a released fan blade.

In a particular embodiment, the nanoparticles added to the resin, which then impregnates each of the selected layers of the composite fan case 24, are clay or clay based reinforcements (e.g. montmorillonite), particle dispersions (e.g. magnetic particles, e.g. Cobalt iron oxide), molecules such as hyper-branched polymers, nano-spheres (e.g. ceramic powders e.g. SiO2, TiO2), elements (e.g. carbon, carbon nanotubes), nanolarge pendant groups grafted on the end of the polymer chain, or any adequate combination thereof.

The nanoparticles are preferably provided within the resin with a content of at least 2 parts per hundred of resin (phr). In a particular embodiment, the nanoparticles are provided up to a content of 10 phr.

As the surface area of a nanoparticle is much smaller than that of a continuous fiber strand, fracture of the nanoparticles and resin-nanoparticle separation predominates and precedes over fiber-resin separation, or fiber pull-out, and over fiber break, because nano-size, or nanometer, fractures are much easier to create than millimeter-sized or micrometer-sized fractures. In other words, the bond between each fiber and the resin resists separation up to a first mean impact energy threshold, while the bond between each nanoparticle and the resin resists separation up to a second mean impact energy threshold, with the first mean impact energy threshold being substantially greater than the second mean impact energy threshold. As such, upon high speed, high energy impact of blade fragments with the fan case 24, a portion of the impact energy is absorbed through separation of the nanoparticles from the resin, with only the portion of the impact energy not absorbed by resin-nanoparticle separation being left for potentially causing fiber pull-out and fiber break. The same applies to the mean impact energy threshold for the braking of the continuous reinforcement fibers and the mean impact energy threshold for the braking of the nanoparticles.

The low energy level absorption from the nanoparticles separation and/or breaking reduce the peak impact load. A reduced peak impact load can reduce the impact load on attachment structures of the engine as well as on aircraft engine mount structures. The nanoparticles can improve the energy absorption at the impact containment area or zone 30 and improve the structural strength and toughness of the fan case 24 for a lighter fan case design.

One gram of nanoparticles, for example nano clay, nano carbon and/or carbon nanotube may contain more than one million particles. The specific surface area can be accordingly more or less 700 to 800 square meters per gram of nanoparticles. Nanoparticles in fan case blade containment area can be provide a vast number of particles per unit volume and large specific surface areas. The nanoparticles can provide the fan case 24 with a higher structural strength and stiffness after blade impact by reducing the amount of continuous fiber break, reduce the amount of fiber pull out from resin, and reduce the amount of ply delamination through the breaking of the nanoparticles and the de-bonding of the nanoparticles from the resin that occurs at a lower energy threshold thereby absorbing a portion of the blade impact energy at the low energy level prior to fiber damage such as breaking of fibers and fiber pull out from the resin and/or ply delamination. In use, the absorption of blade impact energy at low energy threshold level by the nanoparticles can occur before the absorption of blade impact energy at higher energy threshold by the continuous fibers. Reducing the amount of fiber break, fiber pull out, and ply delamination can result in higher strength retention and higher stiffness retention of the fan case 24 after potential blade impact damage, and thus it can reduce the number of plies needed to prevent the collapse of the fan case 24 after blade impact. In addition, the amount of blade impact energy absorbed at low energy level reduce the peak blade impact energy by the amount of energy absorbed by the nanoparticles at low energy level. A lower peak impact energy/load to the fan case 24 can reduce the peak load that the fan case 24 would transfer to its connecting components and in turn can lower the structural requirements for those components. It can therefore enable a lighter structure design for those components for lower weight.

In operation, energy is needed to create new surfaces. When a material breaks, new surfaces are formed and the energy used to form the new surfaces are absorbed by the breaking of the material. At blade impact, the blade impact energy is absorbed by the breaking of the materials of the fan case 24. The dimensions of nanoparticles are several orders of magnitude smaller than 3K tow or higher tow carbon fibers, and the high strain fiber materials used in the manufacture of fiber reinforced polymer composite plies. The energy threshold in breaking the nanoparticles and in de-bonding the nanoparticles from the resin is at a lower energy level than fibers break, fibers pull out from resin, and ply layers delamination.

The fan case 24 can be designed to allow the released fan blade(s) 20 to penetrate the layers 32, 34, 36, 38, 40, and 50 but to be contained in layer 42. By allowing the released fan blade and/or blade fragments to penetrate the layers 36 and 38 which can have limited ductility a relatively lower energy absorption efficiency, the penetration can reduce the size of the backside delamination damage in layer 38. Reducing the size of the backside delamination damage and the amount of fiber break in layers 36 and 38 can improve the retained structural strength and stiffness of the fan case 24 after blade impact and consequently reduce the number of plies required in zone 38 for the strength and stiffness needed to avoid a collapse in the fan case 24. This is because the plies in layers 32, 36 and 38 can provide the structural strength and stiffness for the fan case 24 after the blade impact. In a particular embodiment, the energy absorption efficiency of the high strain fiber materials in layer 42 is higher relative to carbon fibers. The energy absorption in layer 42 can be further enhanced by the use of a low strength low stiffness layer 40 to increase the size of the deformation in layer 42 so as to increase the amount of energy that can be absorbed by the plies in layer 42. In addition the size of the deformation in layer 42 can be increased by interlaying a perforated polymer film in between each ply layer in layer 42. The increased area(s) of deformation and the resultant increased amount of blade impact energy absorbed can also reduce the average stress level in the plies that in turn reduce the number of plies that would get penetrated by the released fan blade 20.

In a particular embodiment, layers 36 and 38 are structural portion of the fan case 24. It can be a design intent to let failed blade to penetrate layer 36 and layer 38 so as to reduce the size of the backside delamination damage in layer 36 and layer 38. Reducing backside delamination can give better structural strength and stiffness retention after blade impact damage. In a particular embodiment layer 40 is a foam material layer that has low structural strength, low modulus, and low penetration resistance. Layer 40 can be designed to allow released or failed blade to penetrate too. A blade containment function in layer 40 is to spread the concentrated impact energy in the hard and low ductile layers in layer 36 and layer 38 to spread over to a larger area in layer 42. Spreading blade impact energy over larger areas in layer 42 can get more high strain fiber materials in layer 42 to absorb more blade impact energy as well as reduce the stress level in the ply layers in layer 42. Reduce stress level in the ply layers in layer 42 can reduce the number of the high strain plies required in layer 42 to contain blade penetration.

The portion of the blade impact energy absorbed at low energy threshold by either one or both of the nanoparticles and the material(s) in layer 40 can reduce the peak blade impact load on the fan case 24. This enables weight reduction in the fan case 24 and weight reduction in the components connected to the fan case 24, such as the engine air inlet case attached to the fan case front flange, the engine intermediate case attached to the fan case rear flange, and the aircraft to engine mount components attached to the engine.

The nanoparticles can be added and premixed to the resin during the manufacture of the fan case 24. For example, the fan case 24 can be manufactured by resin transfer mold (RTM) or by vacuum assist resin transfer mold (VARTM) using epoxy resin having nanoparticles content of at least 2 phr. In an alternate embodiment, the content of the nanoparticles can be up to 10 phr. The nanoparticles may be but not limited to nano-clay, nano-carbon, or carbon nanotube. The carbon nanotube can be single wall or multi walls.

The acoustic treatment layers 46 and 48, and the abradable layer 50, can be assembled to the hybrid nanoparticles composite fan case 24 by adhesive bond autoclave cure.

The above description is meant to be exemplary only, and one skilled in the art will recognize that changes may be made to the embodiments described without departing from the scope of the invention disclosed. For example, the hybrid composite fan case 24 including the inner structure assembly 26 and the outer structure assembly 28 can be used around other rotating equipment which have a risk of producing fragments which must be contained, for example around compressor rotors in a gas turbine engine or elsewhere. Still other modifications which fall within the scope of the present invention will be apparent to those skilled in the art, in light of a review of this disclosure, and such modifications are intended to fall within the appended claims.

The invention claimed is:

1. A composite case for a gas turbine engine, the composite case comprising:
   an inner structure assembly defining an impact containment zone, the inner structure assembly configured to circumscribe a plurality of rotatable blades of the gas turbine engine and to receive blade fragments in an event of blade failure;
   an outer structure assembly surrounding the inner structure assembly, the outer structure assembly including one or more resin-impregnated layers impregnated by a resin reinforced by nanoparticles, and a high strain fiber layer including one or more plies of a high strain fiber, the one or more plies of the high strain fiber being interlaid with a polymer film on either side thereof; and
   at least one honeycomb sandwich structure surrounded by at least one of the one or more resin-impregnated layers, the honeycomb sandwich structure being free of any resin that is reinforced by nanoparticles.

2. The composite case as defined in claim 1, wherein the at least one honeycomb sandwich structure is part of the inner structure assembly.

3. The composite case of claim 2, wherein the inner structure assembly includes one or more resin-impregnated layers impregnated by a resin reinforced by nanoparticles, at least one of the resin-impregnated layers of the inner structure assembly being an outer layer relative to the honeycomb sandwich structure of the inner structure assembly.

4. The composite case of claim 1, wherein the inner structure assembly has a first stiffness configured to allow the blade fragments to pass therethrough and to confine crack propagation to a first region of the impact containment zone due to a passage of a corresponding blade fragment.

5. The composite case of claim 4, wherein the outer structure assembly has a second stiffness configured to deform a second region of the outer structure assembly due to an impact between the corresponding blade fragment and the outer structure assembly.

6. The composite case as defined in claim 5, wherein the second region being greater than the first region.

7. The composite case as defined in claim 1, wherein the inner structure assembly comprises a high strength fiber layer and/or a carbon fiber layer.

8. The composite case as defined in claim 1, wherein the outer structure assembly comprises a foam filled honeycomb layer or a foam filled metal foam layer.

9. The composite case as defined in claim 1, wherein the outer structure assembly comprises a high strain fiber layer and/or a carbon fiber layer, the high strain fiber layer and/or the carbon fiber layer comprising therein the resin containing the nanoparticles.

10. The composite case as defined in claim 1, wherein the polymer film is perforated by a plurality of holes, wherein bonding between the plies of the high strain fiber is intermittently weakened by said holes.

11. The composite case as defined in claim 1, wherein a quantity of the nanoparticles within the resin is from 2 to 10 parts per hundred resin (phr).

12. The composite case as defined in claim 1, wherein the inner structure assembly is integrally molded to the outer structure assembly.

13. The composite case of claim 1, wherein the inner structure assembly includes one or more resin-impregnated layers impregnated by a resin reinforced by nanoparticles.

14. A composite fan case of a gas turbine engine, the composite fan case comprising:
- an inner honeycomb sandwich structure configured to circumscribe a plurality of fan blades of the gas turbine engine, the inner honeycomb sandwich structure being free of any resin that is reinforced by nanoparticles; and
- at least one outer structure assembly surrounding the inner honeycomb sandwich structure, the at least one outer structure assembly including: a high-strain fiber layer with a resin impregnated therein, the high strain fiber layer including one or more plies of a high strain fiber, said one or more plies of the high strain fiber being interlaid with a polymer film on either side thereof, the resin reinforced by a plurality of nanoparticles within the resin; and a polymer foam filled honeycomb layer or a polymer foam filled metal foam layer.

15. The composite fan case as defined in claim 14, wherein the at least one outer structure assembly comprises a carbon fiber layer, the carbon fiber layer comprising the resin containing the nanoparticles.

16. The composite fan case as defined in claim 14, wherein the polymer film is perforated by a plurality of holes, wherein bonding between the plies of the high strain fiber is intermittently weakened by said holes.

17. The composite fan case as defined in claim 14, wherein the inner honeycomb structure and the at least one outer structure assembly are integrally molded into a single unit.

* * * * *